United States Patent
Ogasawara et al.

(10) Patent No.: US 7,174,801 B2
(45) Date of Patent: Feb. 13, 2007

(54) AUTOMATIC TRANSMISSION FOR VEHICLE

(75) Inventors: Takeshi Ogasawara, Sano (JP); Takeshi Satoh, Sano (JP); Daisuke Kondo, Tochigi (JP); Takanori Mori, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 608 days.

(21) Appl. No.: 10/737,926

(22) Filed: Dec. 18, 2003

(65) Prior Publication Data

US 2004/0123693 A1 Jul. 1, 2004

(30) Foreign Application Priority Data

Dec. 24, 2002 (JP) ............................. 2002-371797

(51) Int. Cl.
*B60K 20/00* (2006.01)
(52) U.S. Cl. .................... 74/473.3; 74/473.31
(58) Field of Classification Search .................. 74/469, 74/470, 473.1, 473.29, 473.3, 473.31
See application file for complete search history.

(56) References Cited

U.S. PATENT DOCUMENTS

2004/0016314 A1* 1/2004 Satoh et al. ................ 74/473.3
2004/0123693 A1* 7/2004 Ogasawara et al. ........ 74/473.1
2005/0257637 A1* 11/2005 Osamura et al. ........... 74/473.1
2006/0185461 A1* 8/2006 Kino ......................... 74/473.3

FOREIGN PATENT DOCUMENTS

| DE | 42 04 074 A1 | 8/1992 |
|---|---|---|
| EP | 0 790 442 A1 | 8/1997 |
| JP | 61-76927 A | 4/1986 |
| JP | 5-87237 A | 4/1993 |
| JP | 11-286225 A | 10/1999 |

* cited by examiner

*Primary Examiner*—David M Fenstermacher
(74) *Attorney, Agent, or Firm*—Foley & Lardner LLP

(57) ABSTRACT

In an automatic transmission apparatus (10) for a vehicle provided with a shift lever (20) manually changing a position of an automatic transmission (50), a torque detector (30) for detecting a changing operation force of the shift lever, and an assist force applying means (40) for applying a backup force to the manual operating force of the shift lever so as to transmit to the automatic transmission via a transmitting means (52–54), thereby changing to a desired position, a lever base (26) of the shift lever (20) is mounted to an input shaft (31a) of the rotation axis (31) of the torque detector (30), and an output gear (43) of the assist force applying means (40) is mounted to an output shaft (31b) of the rotation axis (31) of the torque detector (30), and the rotation axis of the shift lever (20), the rotation axis (31) of the torque detector (30) and the rotation axis of the assist force applying means (40) are arranged in a line.

4 Claims, 6 Drawing Sheets

AUTOMATIC TRANSMISSION FOR VEHICLE

CROSS REFERENCE TO RELATED APPLICATIONS

This application is based upon and claims the benefit of priority from the prior Japanese Patent Applications No. P2002-371797, filed on Dec. 24, 2002: the entire contents of which are incorporated herein by reference.

BACKGROUND OF THE INVENTION

1. Field of the Invention

The present invention relates to an automatic transmission apparatus, for example mounted on a vehicle, which has a shift lever for changing a range positions of a range changing mechanism, such as P (Parking), R (Reverse), N (Neutral), D (Drive), 2 (Second) and L (Low), and reduces a passenger's strain for changing the positions of the range changing mechanism by applying an assist force to an operating force of the passenger.

2. Description of the Related Art

FIGS. 1 to 3 shows a structure of a conventional automatic transmission apparatus for a vehicle (for example, refer to a Japanese patent application laid open publication: H11-286225).

As shown in FIGS. 1 to 3, a conventional automatic transmission apparatus 1 for a vehicle is comprised of a shift lever 3 provided in a steering column 2 of a vehicle, a servo actuator 5 applying an assist force to a manual shift operating force for changing a gear position of a changing transmission 4, Bowden cables 6a and 6b connecting the shift lever 3 and the servo actuator 5, a range changing shaft 7 transmitting a rotating operation of the shift lever 3 via the Bowden cables 6a and 6b, a fan-shaped gear 8 connected to the range changing shaft 7 and engaged with a pinion 5A rotated by the servo actuator 5, and a shift lever sensor 9 detecting a position of the shift lever 3. Further, the range changing shaft 7 is rotated corresponding to an amount of operation of the shift lever 3.

However, since the conventional automatic transmission apparatus 1 for the vehicle is provided independently with the shift lever 3, the servo actuator 5 and the shift lever sensor 9, and therefore a transmitting means such as the Bowden cables 6a and 6b connecting the shift lever 3 and the servo actuator 5 are indispensability needed. Accordingly, there are problems that the number of the parts constituting the conventional transmission is increased, and the conventional an entire apparatus is large-scaled and is heavy.

Accordingly, the present invention is made to address the problems mentioned above, and an object of the present invention is to provide an automatic transmission apparatus for a vehicle in which a number of parts can be reduced, and an entire apparatus can be downsized and save weight.

SUMMARY OF THE INVENTION

In order to achieve the object mentioned above, there is provided an automatic transmission apparatus for a vehicle comprising: a shift lever manually changing a position of an automatic transmission; a torque detector for detecting a changing operation force of the shift lever; and an assist force applying means for applying an assist force to the manual operating force of the shift lever so as to transmit to the automatic transmission via a transmitting means, thereby changing to a desired position, wherein a rotation axis of the shift lever, a rotation axis of the torque detector and a rotation axis of the assist force applying means are arranged in a line.

According to the present invention, since the rotation axis of the shift lever, the rotation axis of the torque detector and the rotation axis of the assist force applying means are arranged in a line. It is possible to make the structure compact and light-weighted, and it is also possible to obtain a good operation feeling having a direct feeling.

DETAILED DESCRIPTION OF THE INVENTION

A description of an embodiment according to the present invention will be given below with reference to the accompanying drawings.

Figure 1:
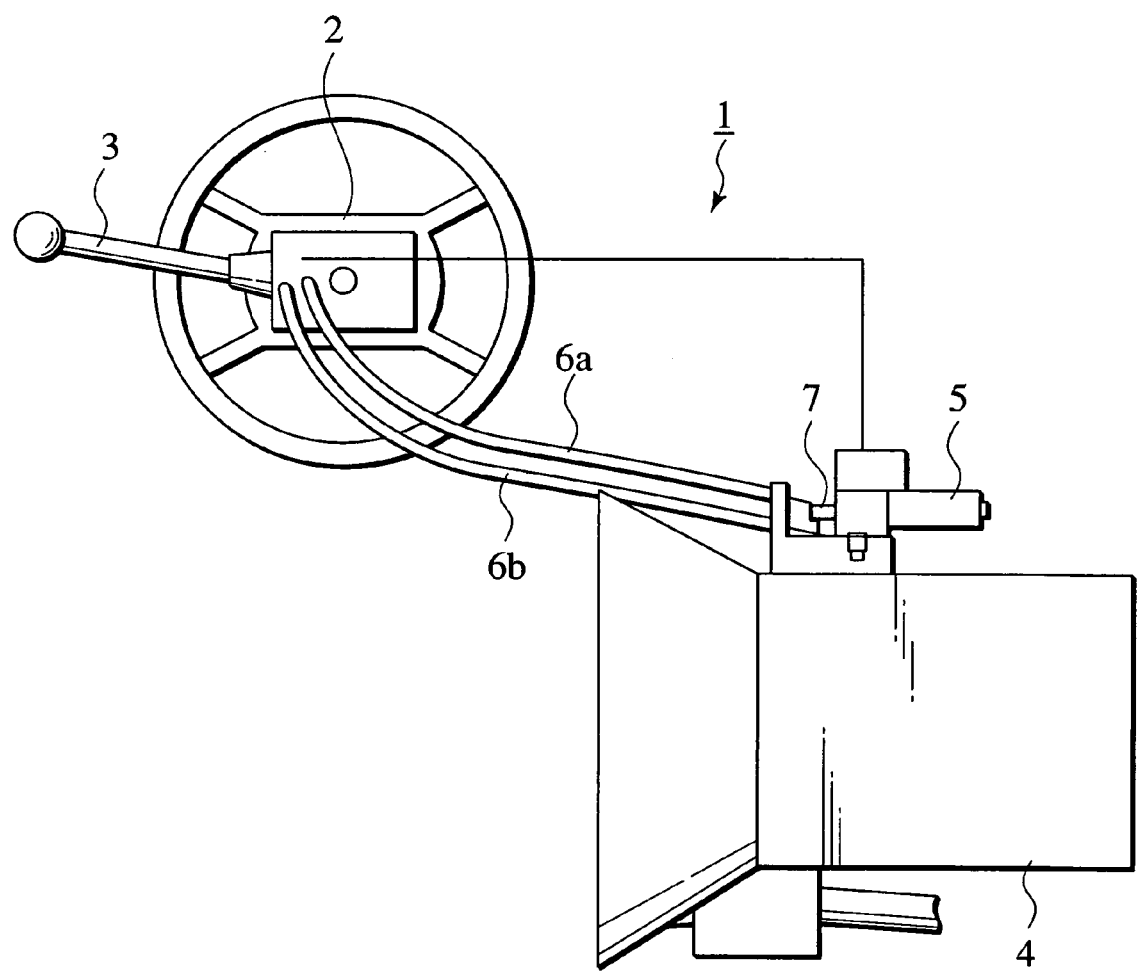
FIG. 1 is a schematic view showing a conventional automatic transmission apparatus for a vehicle.
Figure 2:
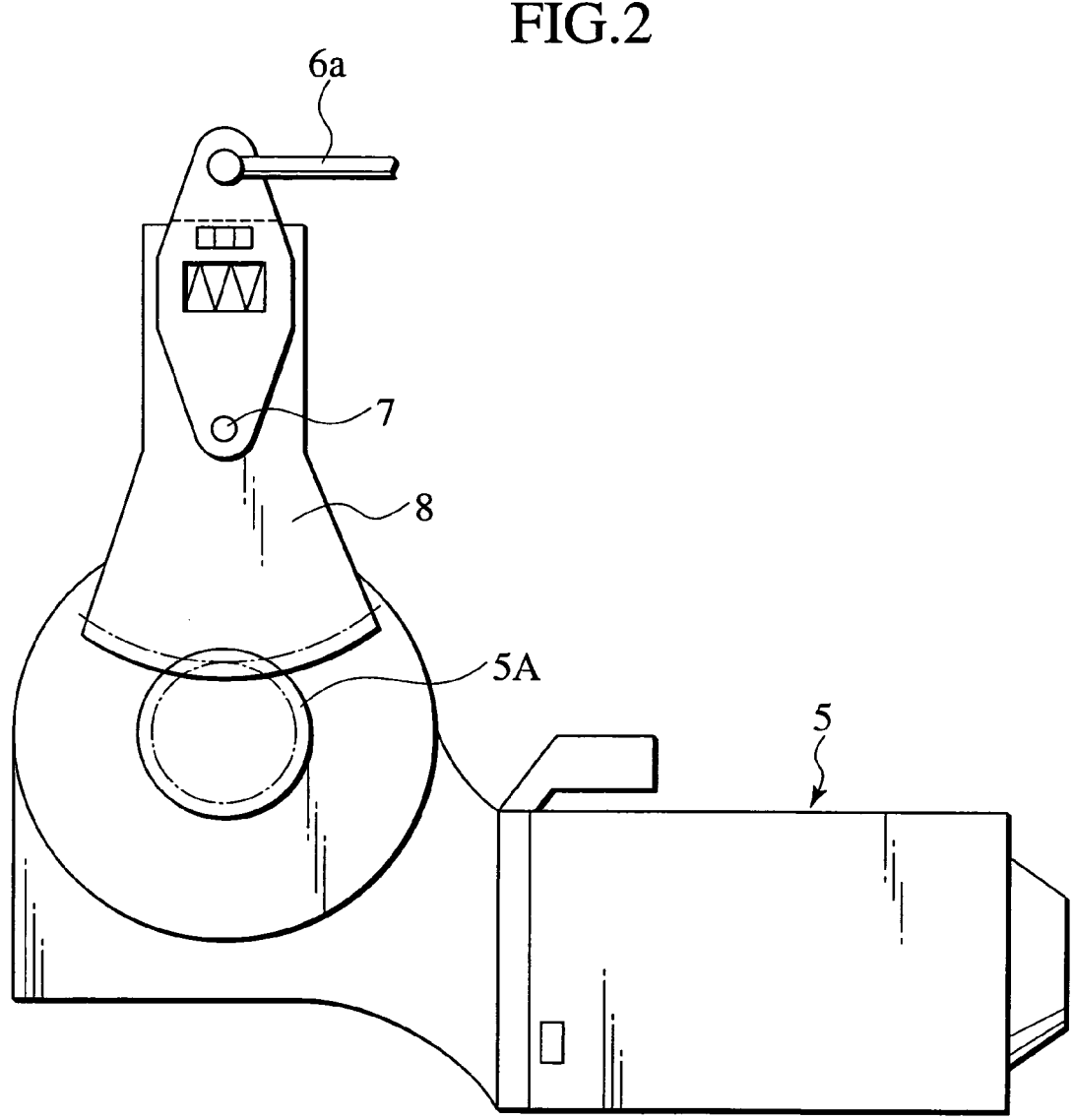
FIG. 2 is an explanatory view of an actuator portion of the conventional automatic transmission apparatus for the vehicle.
Figure 3:
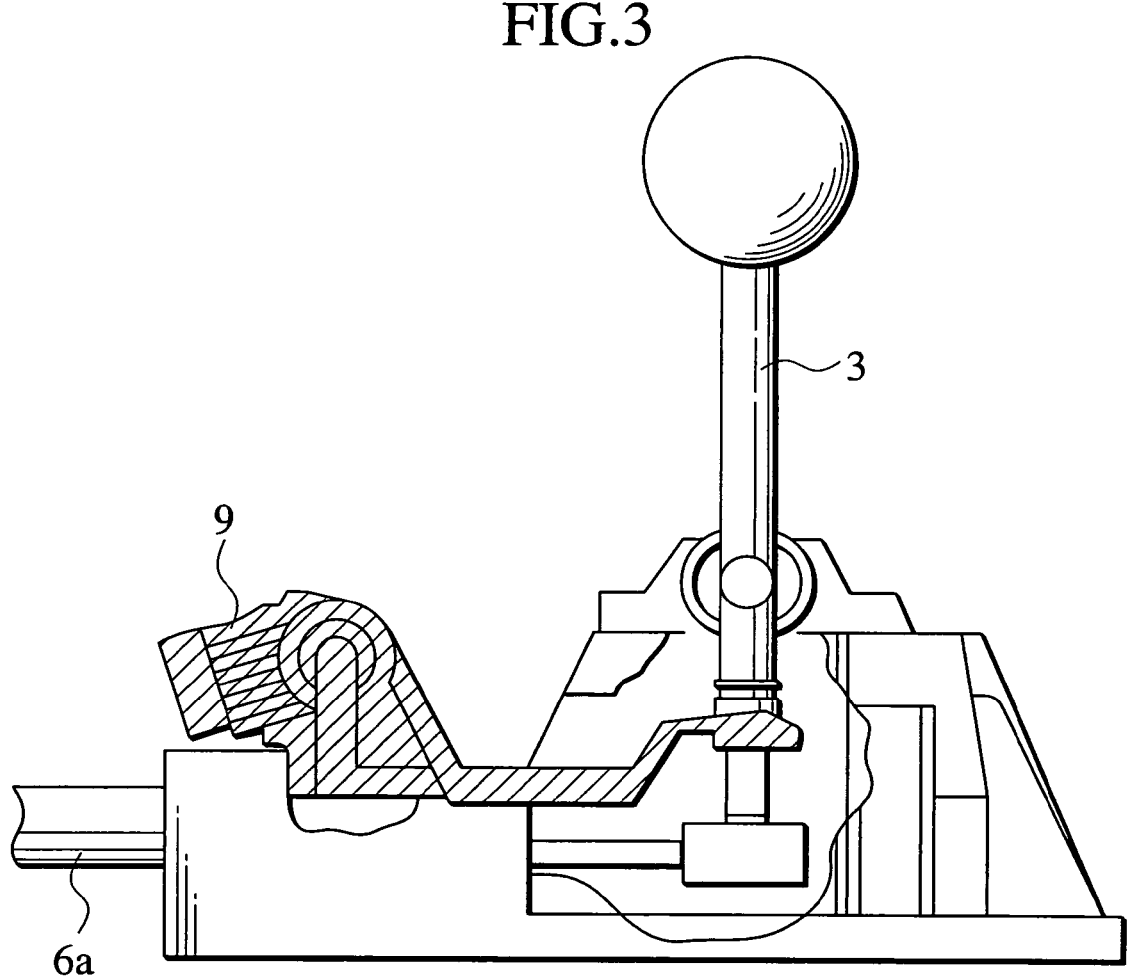
FIG. 3 is an explanatory view of a shift lever portion of the conventional automatic transmission apparatus for the vehicle.
Figure 4:
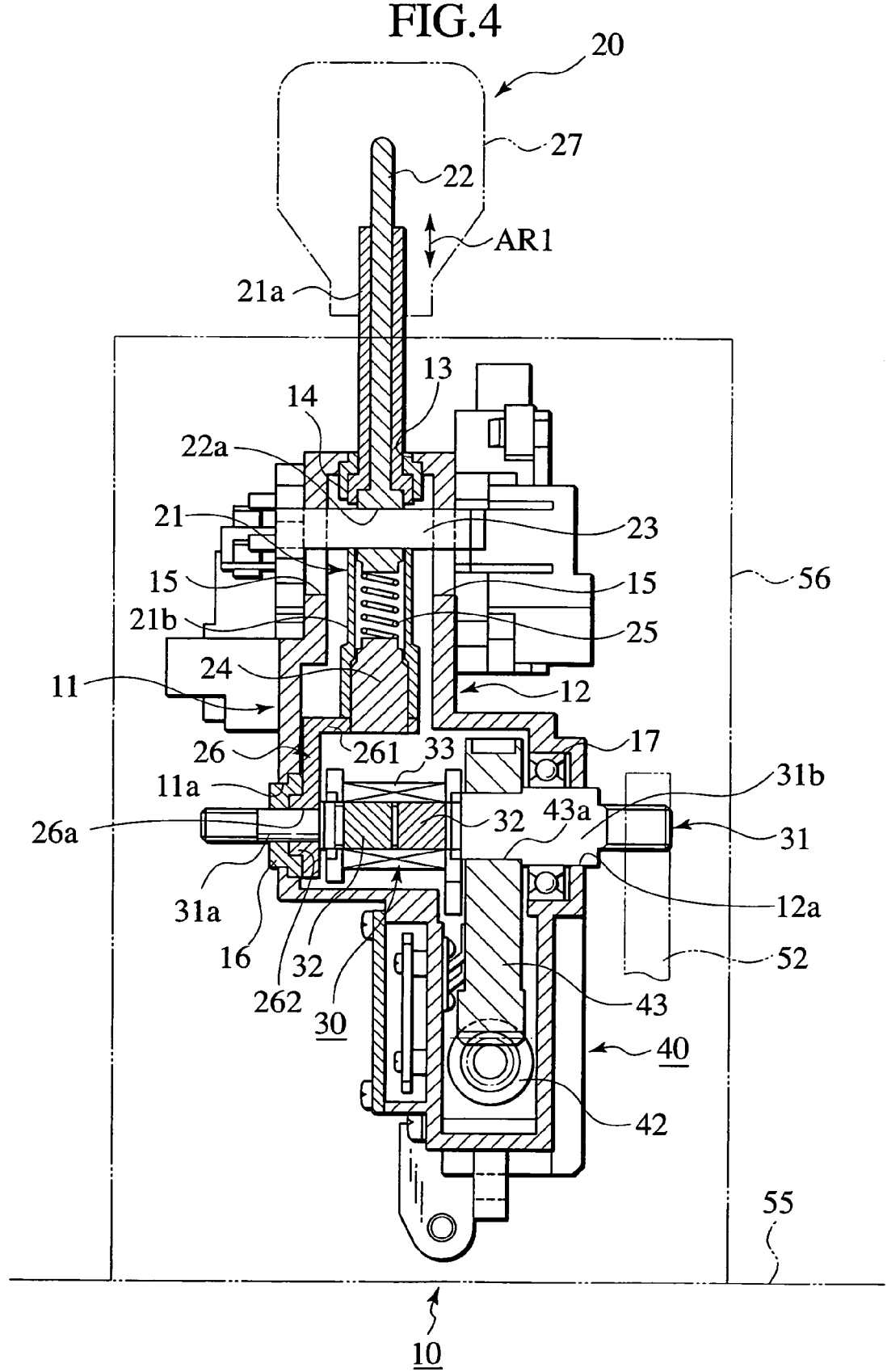
FIG. 4 is a cross sectional view showing an automatic transmission apparatus for a vehicle according to one embodiment of the present invention.
Figure 5:
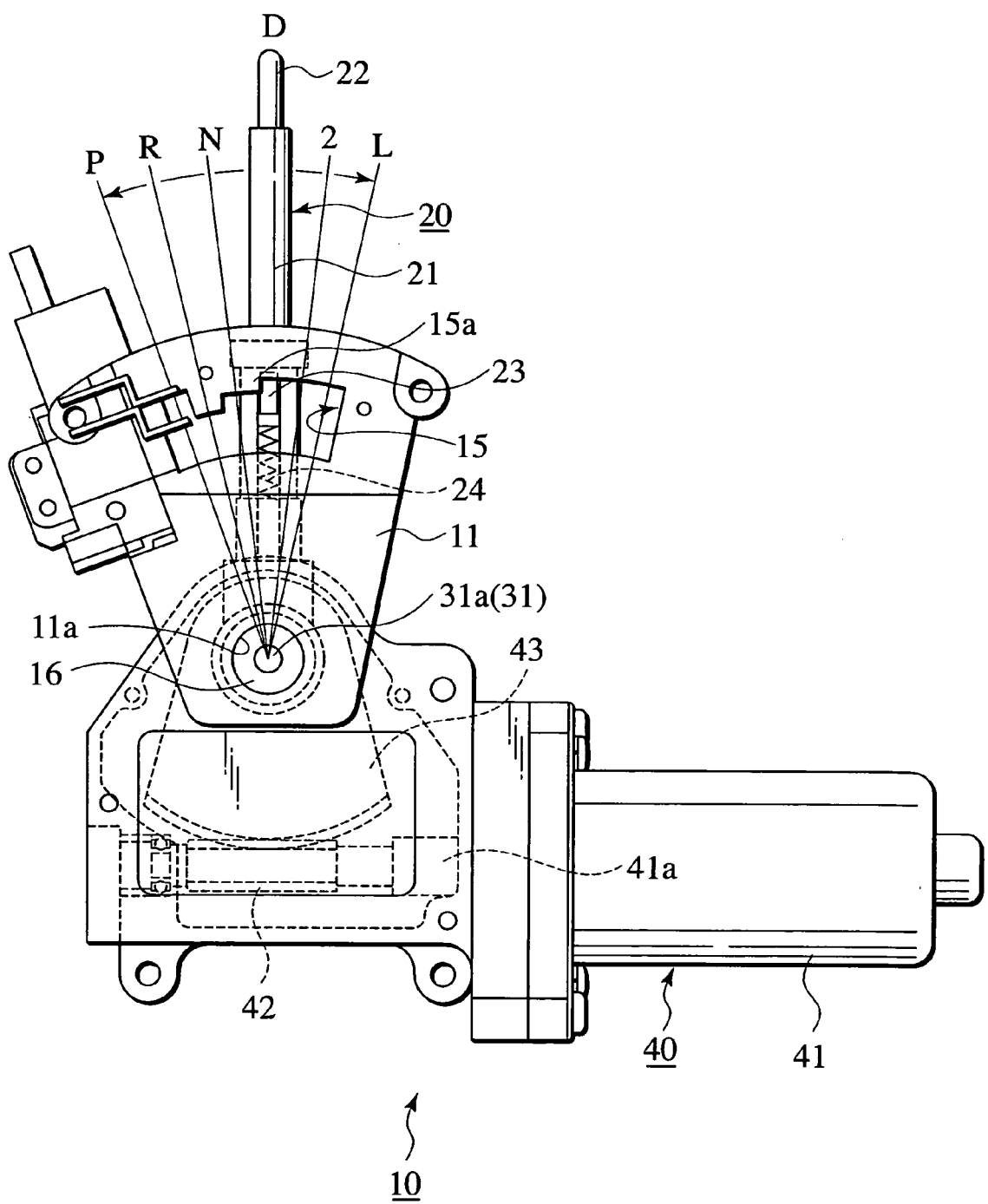
FIG. 5 is a side elevational view of the automatic transmission apparatus for the vehicle.
Figure 6:
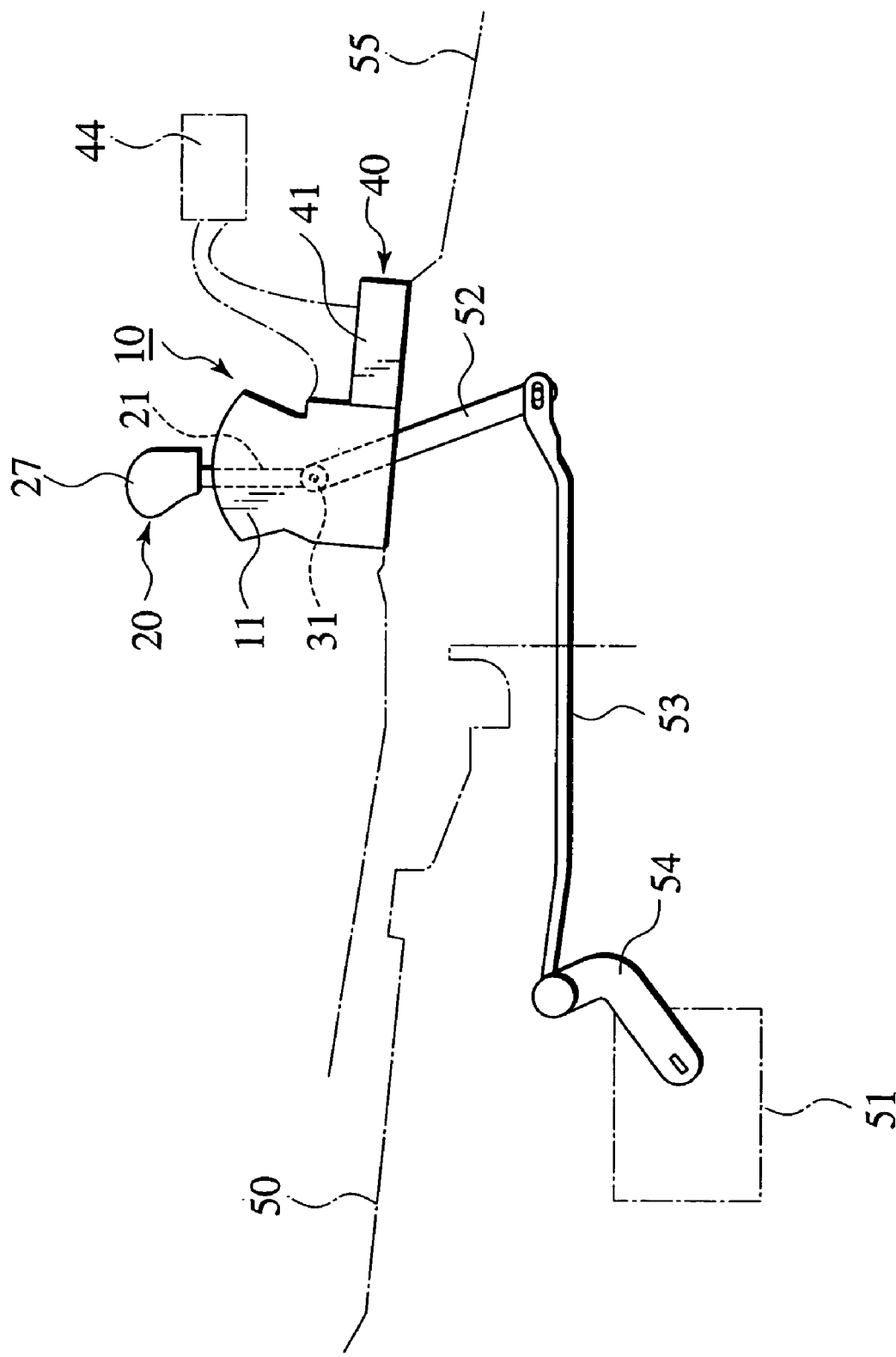
FIG. 6 is a schematic view showing an entire of the automatic transmission apparatus for the vehicle.

As shown in FIGS. 4 to 6, an automatic transmission apparatus 10 for a vehicle comprises a pair of cases 11 and 12 constituting a box-shaped apparatus main body. A shift lever 20 for changing a position of a range changing mechanism 51 of an automatic transmission 50 by manually operated by the passenger, a torque sensor (a torque detector) 30 for detecting an operating force generated when the shift lever 20 is operated by a passenger, and an output gear 43 of an actuator (an assist force applying means) 40 are provided with the pair of cases 11 and 12. The actuator 40 adds a backup force (an assist force) to the manual operating force applied to the shift lever 20 so as to transmit the assist force to the range changing mechanism 51 via transmission means 52, 53, and 54, thereby the shift lever 20 is moved to a desired position.

As shown in FIGS. 4 and 5, the shift lever 20 comprises a lever main body 21 having a hollow-cylindrical small-diameter portion 21a and a hollow-cylindrical large-diameter portion 21b, a rod 22 inserted into a hollow portion of the small-diameter portion 21a of the lever main body 21, a lock pin 23 horizontally inserted to a mounting hole 22a formed in a hollowed-base end portion of the rod 22, a compression coil spring 25 interposed between a stopper 24 press fitted into a base end of the large-diameter portion 21b of the lever main body 21 and a base end of the rod 22 so as to always bias the rod 22 upwardly, an L-shaped lever base 26 welded and fixed to a part of the base end of the large-diameter portion 21b of the lever main body 21, an operation knob 27 mounted to an upper portion of the small-diameter portion 21a [of the lever main body 21] and having an operation button (not shown) for pressing the rod 22 downwardly.

A boundary of the small-diameter portion 21a and the large-diameter portion 21b is slidably supported within a sleeve 14 fitted to a penetrating long hole 13 which is formed on upper surfaces of the pair of cases 11 and 12 and is extended in a longitudinal direction. Further, both sides of the lock pin 23 are configured to be freely engaged with stepped stopper portions 15a of notched holes 15 (see FIG. 5) which are respectively formed in both sides of the pair of cases 11 and 12. In other words, the rod 22 can slide in a direction of an arrow AR1 in FIG. 4. The shift lever 20 is configured to position P (a parking range), R (a reverse range), N (a neutral range), D (a drive range), 2 (a second range) and L (a low range) by pressing the operation button of the operation knob 27 so as to move the rod 22 downwardly [to a lower side], and change a position of the lock pin 23 connected to the base portion of the rod 22 with respect to the stopper portion 15a.

Further, the lever base 26 fixed to the shift lever 20 is mounted to an input shaft 31a of a rotation shaft 31 of the torque detector 30. In detail, the lever base 26 is formed in a L-shaped and comprising a horizontal portion 261 fixed to the shift lever 20 and a vertical portion 262 integrally provided with the horizontal portion 261. The vertical portion 262 of the L-shaped lever base 26 is mounted between one end of the torque detector 30 in a width direction and the case 11. In other words, the lever base 26 is mounted in the direction of a torque detecting portion 33 of the torque detector 30. Accordingly, the lever main body 21 of the shift lever 20 is positioned approximately just above the torque detecting portion 33.

As shown in FIG. 4, the torque detector 30 is comprised of the rotation shaft 31 rotatably supported between a bush 16 fitted to a round hole 11a in an approximately center of the case 11 and a bearing 17 arranged in an inner side of around hole 12a of the case 12, a pair of rotation portions 32, 32 provided between the input shaft 31a and the output shaft 31b of the rotation shaft 31, and the torque detecting portion 33 detecting a torsion torque between the pair of rotation portions 32, 32. The input shaft 31a of the rotation shaft 31 is press fitted to a mounting hole 26a of the lever base 26 in the shift lever 20.

As shown in FIGS. 4 and 5, the actuator 40 is comprised of an electric motor 41 fixed to a back surface side of the pair of cases 11 and 12 by screws (not shown), a worm gear 42 integrally mounted to a rotation shaft 41a of the electric motor 41, a fan-shaped worm wheel (an output gear) 43 which is fixed to a mounting hole 43a being fixed to an inner side of the output shaft 31b of the rotation shaft 31 of the torque detector 30 and is meshed with the warm gear 42, and a control amplifier (a controller) 44 which is connected [connected] to the torque detecting portion 33 and the electric motor 41 and controls a magnitude of the assist force (the backup force) generated by the electric motor 41 in correspondence to a torque (a load) detected by the torque detecting portion 33.

The torque detected by the torque detecting portion 33 of the torque detector 30 is increased according to an increasing amount of the load applied to the shift lever 20. The control amplifier 44 increases an applied voltage of the electric motor 41 corresponding to the detected load of the shift lever 20, thereby the torque of the electric motor 41 is increased. And the increased torque (the assist force) of the electric motor 44 is added to the manual operating force of the shift lever 20. Accordingly, since the control amplifier 44 generates a necessary torque to easily perform the manual shift change operating, even in the case that the shift lever 20 is made short, the force required for operating the shift lever 20 is not increased. In other words, the structure is made such that a part or all of the torque increased by making the shift lever 20 short can be compensated by the torque generated by the electric motor 41.

In this case, as shown in FIGS. 4 and 6, the automatic transmission apparatus 10 for the vehicle is installed in a console box 56 mounted on a floor panel 55. Further, one end of a control lever (a first transmitting means) 52 is fixed to an outer side of the output shaft 31b of the rotation shaft 31 in the torque detector 30. Another end side of the control lever 52 is connected to a range changing mechanism 51 via a linkage (a second transmitting means]) 53 and a control arm (a third transmitting means) 54.

As mentioned above, according to the automatic transmission apparatus 10 for the vehicle of the present embodiment, the shift lever 20, the torque detector 30 and the actuator 40 are integrally provided with the pair of cases 11 and 12, these elements being conventionally separated into a plurality of parts. In other words, since the rotation shaft of the shift lever 20 is performed both as the input shaft 31a of the rotation shaft 31 of the torque detector 30, the rotation shaft of the worm wheel 43 serving as the output gear of the actuator 40 is performed both as the input shaft 31b of the rotation shaft 31 of the torque detector 30, and the rotation shaft 31 of the shift lever 20, the rotation shaft 31 of the torque detector 30 and the rotation shaft of the worm wheel 43 of the actuator 40 are performed both as one rotation shaft 31 so as to be arranged in a line, it is possible to obtain a good operation feeling having a direct feeling with no play or the like in the case of changing the shaft lever 20 to each of the range positions.

Further, since the lever base 26 of the shift lever 20 is fixed to the input shaft 31a of the rotation shaft 31 of the torque detector 30, and the worm wheel 43 of the actuator 40 is fixed to the output shaft 31b of the rotation shaft 31 of the torque detector 30, the rotation shaft of the shift lever 20 and the rotation shaft of the worm wheel 43 are not required. Accordingly, it is possible to reduce the number of the parts, and it is possible to achieve a weight saving and a cost reduction.

Further, since the L-shaped lever base 26 of the shift lever 20 is fixed to the input shaft 31a of the rotation shaft 31 of the torque detector 30 so as to be offset arranged with respect to the torque detecting portion 33 of the torque detector 30, and the lever main body 21 of the shift lever 20 is arranged just above the torque detecting portion 33, it is possible to reduce an entire width of the automatic transmission apparatus 10 for the vehicle, and it is possible to achieve a downsizing.

Further, since the rotation shaft 31 of the torque detector 30 can be comprised of the metal shaft, it is possible to prevent the play from being increased by a durability deterioration, the characteristic is not changed, and it is possible to always keep a good characteristic.

What is claimed is:

1. An automatic transmission apparatus for a vehicle comprising:
   a shift lever changing a range position of an automatic transmission;
   a torque detector for detecting a changing operation force applied to the shift lever; and
   an assist force applying means which adds an assist force to the manual operating force applied to the shift lever so as to transmit the manual operating force with the assist force to the automatic transmission via a transmitting means and changes the range position of the automatic transmission, wherein a rotation axis of the shift lever, a rotation axis of the torque detector and a rotation axis of the assist force applying means are arranged in a line.

2. An automatic transmission apparatus for a vehicle according to claim 1, wherein a lever base of the shift lever is mounted to a side of an input shaft of the rotation axis of the torque detector, and an output gear of the assist force applying means is mounted to a side of an output shaft of the rotation axis of the torque detector.

3. An automatic transmission apparatus for a vehicle according to claim 2, wherein the lever base of the shift lever is mounted so as to be offset arranged with respect to a torque detecting portion of the torque detector, and a lever main body of the shift lever is arranged approximately just above the torque detecting portion.

4. An automatic transmission apparatus for a vehicle according to claim 1, wherein the assist force applying means further comprises a motor to generates the assist force.

* * * * *